(12) United States Patent
Park et al.

(10) Patent No.: US 6,495,068 B1
(45) Date of Patent: Dec. 17, 2002

(54) YTTRIUM SILICATE BASED PHOSPHOR AND METHOD FOR SYNTHESIZING THE PHOSPHOR BY SURFACE COATING

(75) Inventors: Shang-hyeun Park, Chungcheongnam-do (KR); Ji-hye Gwak, Seoul (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/669,569

(22) Filed: Sep. 26, 2000

(30) Foreign Application Priority Data

Apr. 26, 2000 (KR) .............................. 00-22162

(51) Int. Cl.[7] .............................................. C09K 11/00
(52) U.S. Cl. ....................... 252/301.4 R; 252/301.48; 428/403; 428/404
(58) Field of Search ................. 428/403, 404; 252/301.4 R, 301.4 S

(56) References Cited

FOREIGN PATENT DOCUMENTS

KR    1982-0001593    9/1982

*Primary Examiner*—C. Melissa Koslow
(74) *Attorney, Agent, or Firm*—Burns, Doane, Swecker & Mathis, L.L.P.

(57) ABSTRACT

A yttrium silicate based phosphor and a method for synthesizing the phosphor by surface coating. The yttrium silicate based phosphor is synthesized by surface coating a $Y_2SiO_5$:Tb phosphor coated with a strontium (Sr)-thiogallate phosphor. In the method, $Ga(NO_3)_3$, $Eu(NO_3)_3$ and $SrCO_3$ are mixed and stirred until the $SrCO_3$ is completely dissolved. Next, a $Y_2SiO_5$:Tb phosphor is added to the mixture, and a sodium hydroxide (NaOH) is added to the mixture containing the $Y_2SiO_5$:Tb to adjust pH. Then, sulfur (S) is added to the pH-adjusted mixture. The sulfur containing mixture is dried, sieved, and fired at 750° C. for 4 hours.

4 Claims, 4 Drawing Sheets

UNCOATED

COATED-1

COATED-2

YTTRIUM SILICATE BASED PHOSPHOR AND METHOD FOR SYNTHESIZING THE PHOSPHOR BY SURFACE COATING

BACKGROUND OF THE INVENTION

1. Field of the Invention

The present invention relates to a yttrium silicate based phosphor and a method for synthesizing a yttrium silicate based phosphor by surface coating.

2. Description of the Related Art

Field emission devices., which operates with a driving voltage as low as 1 kV or less, requires a high emission phosphor. When an existing sulfide based phosphor is deposited in a FED, the chemical stability of phosphor is lowered and charges accumulate at the phosphor surface during operation. To account for these problems, many approaches have been conducted into oxide based phosphors. As a result, yttrium silicate based phosphors have been considered to be a superior oxide series phosphor.

Yttrium silicate based phosphors are thermally and chemically stable compared to sulfide based phosphors. However, the chromaticity coordinates and luminance of the yttrium silicate based phosphors are inferior. An existing green-light-emitting sulfide based phosphors for use FEDs, for example, ZnS:Cu, Al phosphors, have chromaticity coordinates (x=0.333, y=9,614). On the other hand, oxide based phosphors, such as $Y_2SiO_5$:Tb phosphors, have chromaticity coordinates (x=0.333, y=0.582). In particular, the luminance of the oxide based phosphor is about 30 to 40% of that of sulfide based phosphors. Sulfide based phosphors, which are in use, are effective for FEDs operated with a high driving voltage (5 to 10 kV). However, when a driving voltage is as low as 1 kV or less, such sulfide based phosphors have the problems of low luminance and charge build-up, as previously described. Thus, there is a need for a new oxide based phosphor having effective emission at low voltages.

SUMMARY OF THE INVENTION

To solve the above problems, it is an objective of the sent invention to provide a yttrium silicate based phosphor with enhanced luminance, chromaticity coordinates and aging characteristics, and a method of synthesizing the same by surface coating, in which a thermally and chemically stable yttrium silicate based phosphor is coated with a strontium (Sr)-thiogallate phosphor having superior luminance and chromaticity coordinates.

According to an aspect of the present invention, there is provided a yttrium silicate based phosphor synthesized by surface coating a yttrium silicate phosphor, such as $Y_2SiO5$:Tb phosphor, coated with a strontium (Sr)-thiogallate phosphor, having the formula $Y_2SiO_5$:Ln+ $SrGa_2S_4$:Lm, where Ln is a lanthanide element selected from the group consisting of gadolinium (Gd), terbium (Tb), cerium (Ce) and europium (Eu), and Lm is an element selected from the group consisting of Eu, Tb and Ce.

According to another aspect of the present invention, there is provided a method for synthesizing a yttrium silicate based phosphor by surface coating, comprising the steps: (a) mixing $Ga(NO_3)_3$, $Lm(NO_3)_3$, where Lm is Eu, Th or Ce, and $SrCO_3$, and stirring the mixture in a solvent until the $SrCO_3$ is completely dissolved; (b) after $SrCO_3$ is completely dissolved in step (a), adding a $Y_2SiO_5$:Ln phosphor, where Ln is Gd, Eu, Tb or Ce, to the mixture from step (a); (c) adding a sodium hydroxide (NaOH) to the mixture containing the $Y_2SiO_5$:Ln to adjust pH, and adding sulfur (S) to the pH-adjusted mixture; (d) drying and sieving the sulfur containing mixture from step (c); and (e) firing the sieved phosphor mixture from step (d) at 750° C. for 4 hours.

Preferably, the resulting mixture obtained through steps (a) through (e) is a yttrium silicate based phosphor having the formula $Y_2SiO_5$:Ln+$SrGa_2S_4$:Lm, where Ln is a lanthanide element selected from the group consisting of gadolinium (Gd), terbium (Tb), cerium (Ce) and europium (Eu), and Lm is an element selected from the group consisting of Eu, Tb and Ce.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION.

A surface coated yttrium silicate based phosphor according to the present invention, which is a yttrium silicate phosphor, such as $Y_2SiO_5$:Tb phosphor, coated with a strontium (Sr)-thiogallate phosphor, has the formula $Y_2SiO_5$:Ln+ $SrGa_2S_4$:Lm, where Ln is a lanthanide element selected from the group consisting of gadolinium (Gd), terbium (Tb), cerium (Ce) and europium (Eu), and Lm is an element selected from the group consisting of Eu, Tb and Ce.

The surface coated yttrium silicate based phosphor, a $Y_2SiO_5$:Tb phosphor with superior luminance and chromaticity coordinates, is synthesized as follows.

Figure 1:
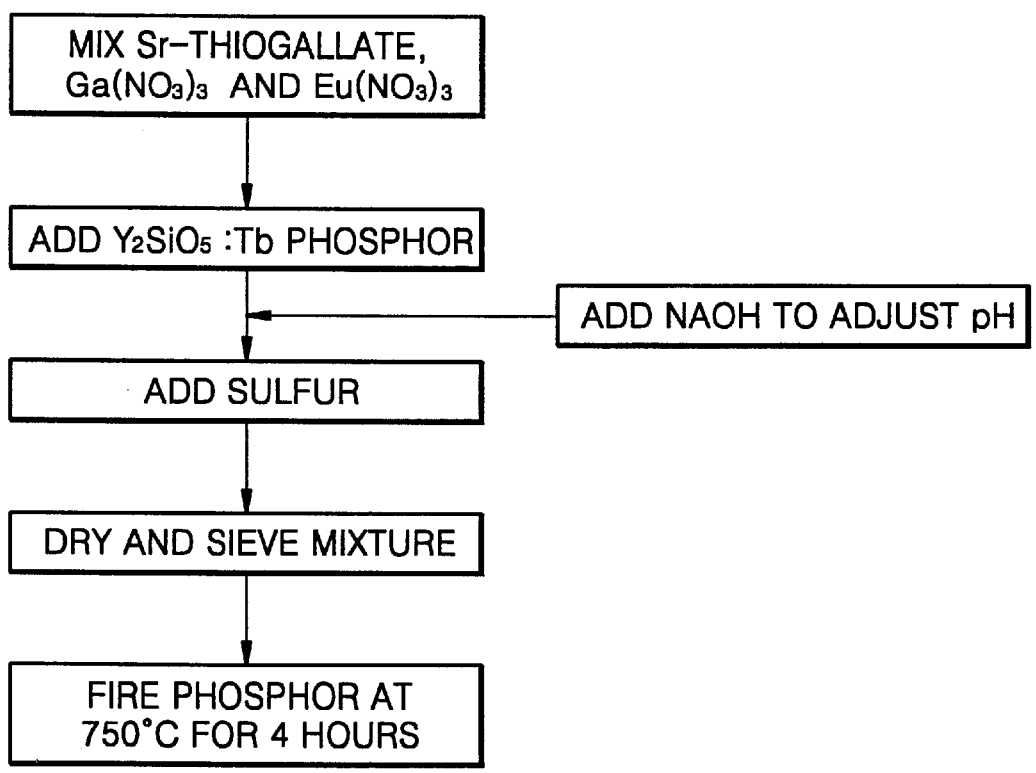
FIG. 1 is a block diagram illustrating a method for synthesizing a yttrium silicate based phosphor by surface coating according to the present invention, and particularly, illustrating coating a green-light emitting oxide based phosphor $Y_2SiO_5$:Tb with a strontium (Sr)-thiogallate phosphor.

Referring to FIG. 1, firstly $Ga(NO_3)_3$, $Eu(NO_3)_3$ and $SrCO_3$ are mixed and stirred, for example, for about 15 minutes until the $SrCO_3$ is completely dissolved. After $SrCO_3$ is completely dissolved, a $Y_2SiO_5$:Tb phosphor is added to the mixture. For this experiment, a $Y_2SiO_5$:Tb phosphor ("Nichia") was purchased to give a more objective result.

Next, a sodium hydroxide (NaOH) is added to the mixture containing the $Y_2SiO_5$:Tb to adjust pH at 8 to 8.5. Sulfur (S)

is added to the pH-adjusted mixture, and dried and sieved. The phosphor particles passed through a sieve is fired at 750° C. for 4 hours.

The present invention will be described in greater detail by means of the following examples. The following examples are for illustrative purposes and not intended to limit the scope of the invention.

EXAMPLE 1

Phosphors were synthesized by coating two amounts of $Y_2SiO_5$:Tb phosphor ("Nichia") with two different amounts of Sr-thiogallate phosphor, as shown in Table 1. For comparison, an uncoated phosphor was prepared as a reference sample. The luminance and chromaticity coordinates of the phosphors coated with different amounts of Sr-thiogallate, and the uncoated phosphor, are shown in Table 1.

improves the luminance and chromaticity coordinates of the phosphor at low voltages, and the coating condition considerably affects the luminance and chromaticity coordinates of phosphor.

As previously mentioned, the surface coated yttrium silicate based phosphor is synthesized by mixing $Ga(NO_3)_3$, $Eu(NO_3)_3$ and $SiCO_3$ until the $SiCO_3$ is completely dissolved. Next, a $Y_2SiO_5$:Tb phosphor is added to the mixture, and the pH is adjusted with NaOH. After adding S to the pH-adjusted mixture, the phosphor mixture is dried and sieved. A sintering process is performed at 750° C. for 7 hours, which results in Sr-thiolate coated $Y_2SiO_5$:Tb phosphor with enhanced brightness. The phosphor coated with 13% by weight Sr-thiogallate shows a 200% increase in brightness at a voltage as low as 1 kV or less, compared to the uncoated phosphor. The chromaticity coordinate is shifted from (x=0.3368, y=0.5802) to (x=0.3109, y=0.6316).

TABLE 1

| Sample | Composition | Brightness (cd/m²) | | | | | Chromaticity Coordinates | |
| | | 300 eV | 400 eV | 500 eV | 700 eV | 1 kV | x | y |
| --- | --- | --- | --- | --- | --- | --- | --- | --- |
| Uncoated | Nichia | 13.1 | 22.5 | 35.6 | 89.4 | 268.9 | 0.3368–0.3353 | 0.5802–0.5736 |
| Coated-1 | Nichia + Sr $Ga_2S_4$:Eu (13 wt %) | 26.3 | 45.0 | 64.5 | 129.8 | 210.7 | 0.3109–0.3309 | 0.6316–0.5947 |
| Coated-2 | Nichia + Sr $Ga_2S_4$:Eu (4 wt %) | 15.6 | 27.2 | 38.3 | 99.1 | 205.3 | 0.3322–0.3365 | 0.5931–0.5805 |

Figure 2:
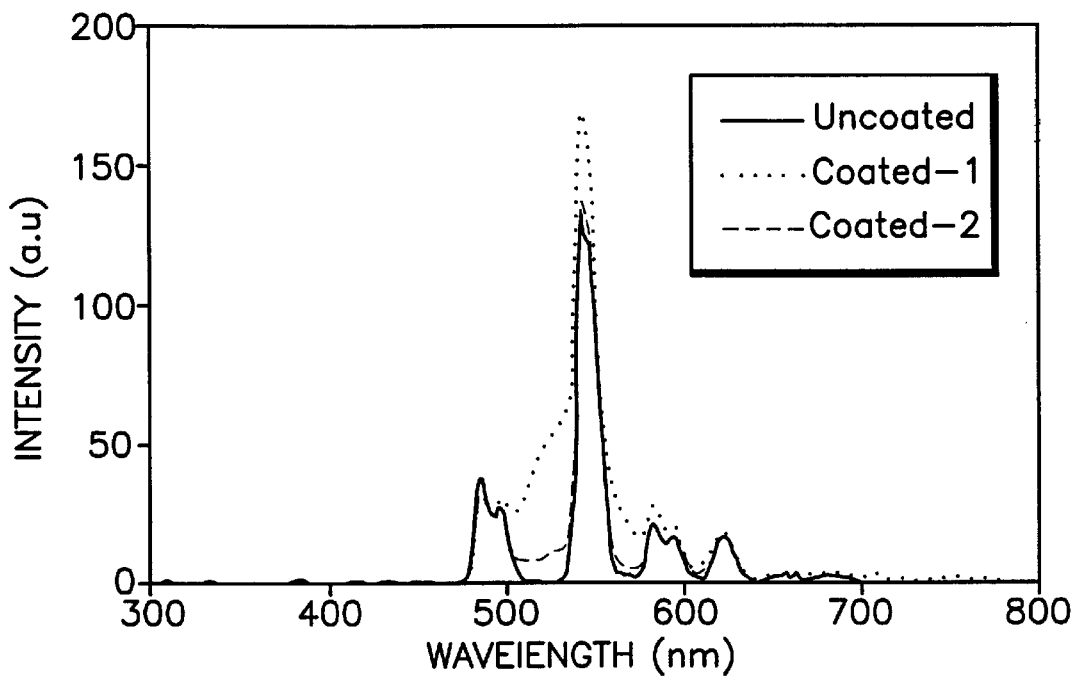
FIG. 2 illustrates photoluminescent spectra of a conventional uncoated phosphor and the phosphors prepared by the method of FIG. 1, exciting at 300 eV.

Various characteristics of the three phosphor samples are comparatively illustrated in FIGS. 2 through 6. In particular, FIG. 2 illustrates the photoluminescent spec emitting at 300 eV for each phosphor. The emission peak of the uncoated phosphor at about 550 nm shows the lowest intensity. Meanwhile, the emission peak of the phosphor (Coated-1) at the same wavelength is the highest.

Figure 3:
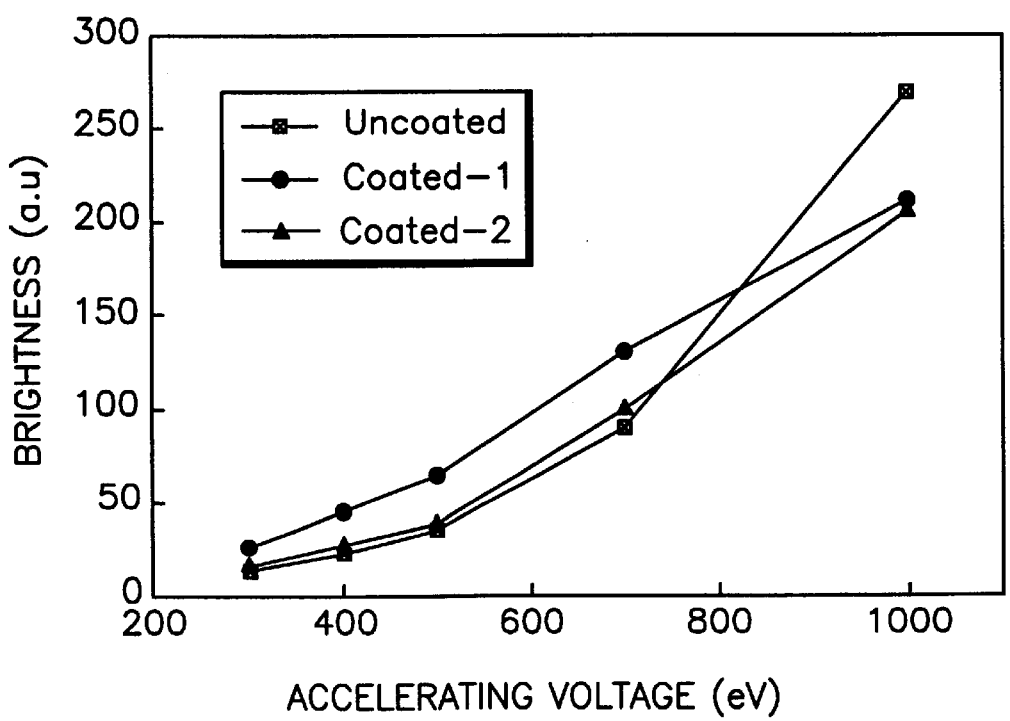
FIG. 3 is a graph showing the brightness of the conventional uncoated phosphor and the phosphors prepared by the method of FIG. 1, which was measured with cathodeluminescence (CL) using a thermionic electron gun in a UHV chamber (at $10^{-7}$ Torr)

The brightness of the three phosphors were measured with cathodoluminescence (CL), using a thermionic electron gun in a UHV chamber (at $10^{-7}$Torr). The results are shown in FIG. 3. The CL measurement was carried out at an accelerating voltage in the range of 300 to 1000 eV (with a current of 0.2 to 0.5 mA). When a voltage (energy) level is as low as about 800 eV or less, the phosphor labeled with Coated 1 shows the highest brightness. On the other hand, at a high voltage level of 800 eV or more, the phosphor with the highest brightness is shown to be the conventional uncoated phosphor.

Figure 4:
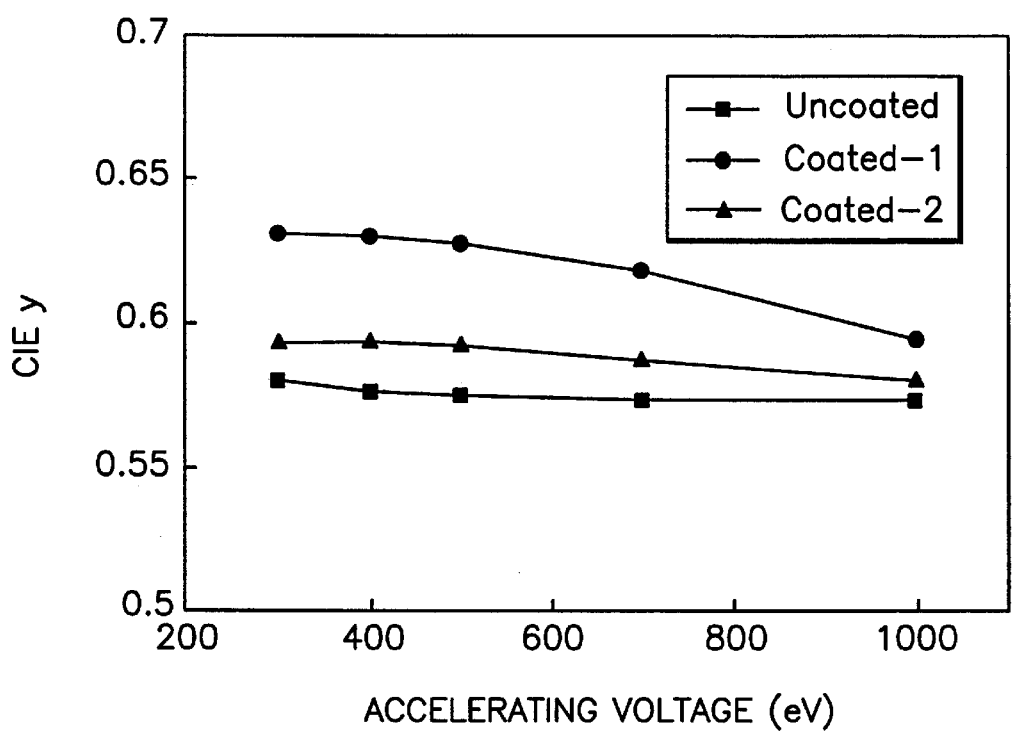
FIG. 4 is a graph showing chromaticity characteristics (CIE y) of the conventional uncoated phosphor and the phosphors prepared by the method of FIG. 1, with respect to accelerating voltage in an FED.
Figure 5:
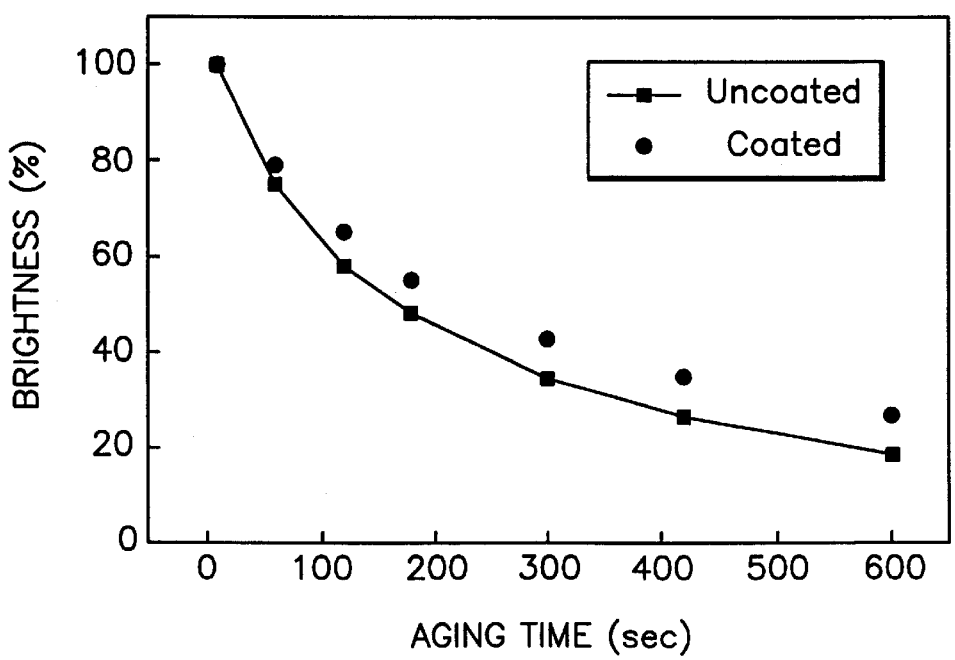
FIG. 5 is a graph showing the brightness of the conventional uncoated phosphor and the phosphors prepared by the method of FIG. 1, with respect to aging time.
Figure 6A:
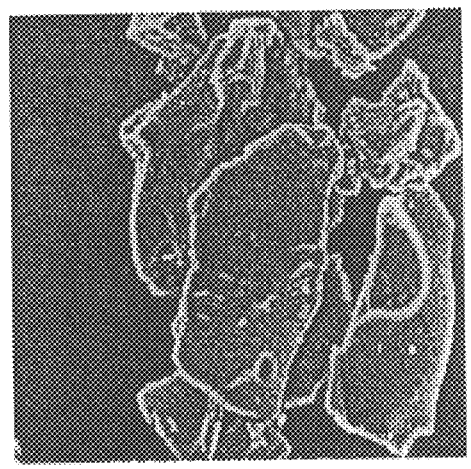
FIGS. 6A through 6C are scanning electron microscopy (SEM) images of the conventional uncoated phosphor, and the two coated phosphors, respectively, which show morphology and crystalline properties of the phosphors.
Figure 6B:
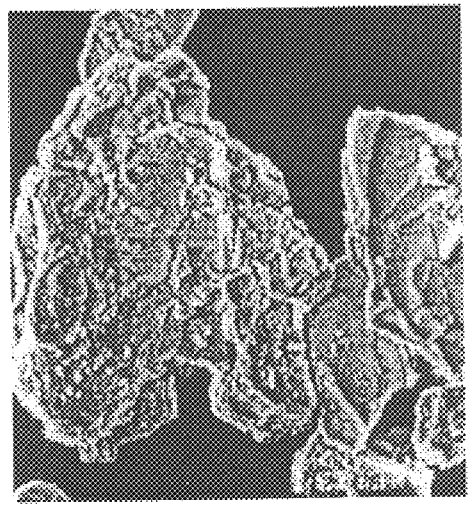
Figure 6C:
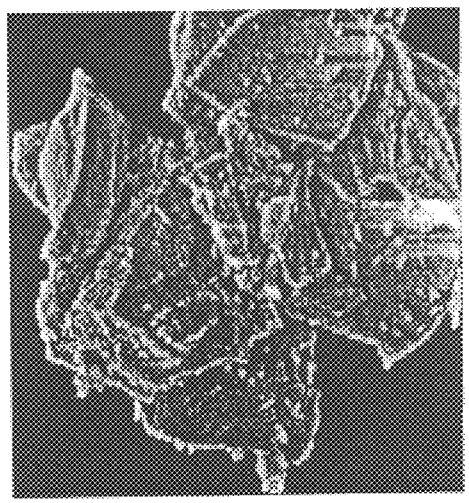

FIG. 4 shows the chromaticity characteristics (CIE y) of each phosphor with respect to accelerating voltage. Coated-1 shows the highest coordinated value over the measured range of accelerating voltage, while the conventional uncoated phosphor shows the lowest value. FIG. 5 is a graph showing the variation in brightness at 400 eV of the phosphors with respect to aging time. As shown in FIG. 5, as time passes, the decrease in brightness is faster for the uncoated phosphor (-■-) than for the coated phosphor (●). To evaluate the morphology and crystalline Do characteristics of the phosphors, the crystalline structures of the phosphors were observed by scanning electron microscopy (SEM). The results are shown in FIGS. 6A through 6C. FIG. 6A is for the uncoated phosphor, FIG. 6B is for the coated-1 phosphor, and FIG. 6C is for the coated-2.

From the results described above, it is concluded that coating a yttrium silicate based phosphor with Sr-thiogallate The chromaticity and aging characteristics of the coated phosphor are also better than those of the uncoated phosphor.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A yttrium silicate based phosphor, comprising a yttrium silicate phosphor coated with a strontium (Sr)-thiogallate phosphor, wherein the yttrium silicate based phosphor has the formula $Y_2SiO_5$:Ln+$SrGa_2S_4$:Lm, where Ln is a lanthanide element selected from the group consisting of gadolinium (Gd), terbium (Tb), cerium (Ce) and europium (Eu), and Lm is an element selected from the group consisting of Eu, Tb and Ce.

2. A method for synthesizing a yttrium silicate based phosphor, comprising:
   (a) mixing $Ga(NO_3)_3$, $Lm(NO_3)_3$, where Lm is an element selected from the group consisting of Eu, Th and Ce, and $SrCO_3$, and stirring the mixture in a solvent until the $SrCO_3$ is completely dissolved;
   (b) after $SrCO_3$ is completely dissolved in step (a), coating a $Y_2SiO_5$:Ln phosphor with the mixture from step (a), where Ln is a lanthanide element selected from the group consisting of Gd, Tb, Ce and Eu;
   (c) adding a sodium hydroxide (NaOH) to the mixture containing the $Y_2SiO_5$:Ln to adjust pH, and adding sulfur (S) to the pH-adjusted mixture;
   (d) drying and sieving the sulfur containing mixture from step (c); and
   (e) firing the sieved phosphor mixture from step (d) at conditions effective to form the yttrium silicate based phosphor.

3. The method of claim 2, wherein the resulting mixture obtained through steps (a) through (e) is a yttrium silicate based phosphor coated with a strontium (Sr)-thiogallate phosphor, wherein the yttrium silicate based phosphor has the formula $Y_2SiO_5$:Ln+$SrGa_2S_4$:Lm, where Ln is a lanthanide element selected from the group consisting of gadolinium (Gd), terbium (Th), cerium (Ce) and europium (Eu), and Lm is an element selected from the group consisting of Eu, Th and Ce.

4. The method of claim 2, wherein step (e) further comprises firing the sieved phosphor mixture from step (d) at 750° C. for 4 hours.

* * * * *